Sept. 6, 1960 M. ARDITI 2,951,992

ATOMIC FREQUENCY STANDARD

Filed April 29, 1958 2 Sheets-Sheet 1

Inventor
MAURICE ARDITI
By Philip M. Bolton
Attorney

Inventor
MAURICE ARDITI
By Philip M. Bolton
Attorney

United States Patent Office 2,951,992
Patented Sept. 6, 1960

2,951,992

ATOMIC FREQUENCY STANDARD

Maurice Arditi, Clifton, N.J., assignor to International Telephone and Telegraph Corporation, Nutley, N.J., a corporation of Maryland Filed Apr. 29, 1958, Ser. No. 731,766

8 Claims. (Cl. 331—3)

This invention relates to an atomic frequency standard using simultaneous detection of a plurality of microwave hyperfine transitions in the ground state of an alkali metal vapor.

It has heretofore been proposed to use the frequency selective atomic transitions in an alkali metal vapor cell as a control for an oscillator to thereby provide a frequency standard. Devices of this type have been termed "Atomic Clocks." One of the desiderata of such a clock is that it be relatively insensitive to changes in the ambient magnetic field. On the other hand, it is also desired that the control signal obtained from the transitions in the alkali metal vapor cell have a large signal-to-noise ratio to thereby provide better control of the atomic clock frequency. Certain transitions which provide such a large signal-to-noise ratio control signal, particularly when optically pumped, unfortunately are sensitive to changes in the ambient magnetic field. Two of such transitions are $\Delta F=1 \Delta m_F=+1$ and $\Delta F=1 \Delta m_F=-1$ where F designates a hyperfine ground energy level state of the alkali metal vapor and $m_F$ designates one of its Zeeman sub-levels. A characteristic of these two kinds of transitions is that the center frequencies of their frequency selective characteristics vary symmetrically and in opposite directions with corresponding changes in the strength of the magnetic field in which they occur. In the copending U.S. application of A. Kastler-M. Arditi for "Frequency Selection System Utilizing a Plurality of Transitions," intended to be filed simultaneously herewith, filed April 29, 1958, Serial No. 736,431, there is described an atomic clock which simultaneously utilizes both these kinds of transitions, the frequency selective characteristic of each transition being used in controlling a separate crystal oscillator; the result of this is that the frequency of each crystal oscillator is locked to that of a different one of said two kinds of transitions. As the magnetic field varies, the frequency of one of said crystal oscillators will go up, while that of the other will go down by an equal amount. Consequently, when the frequencies of the two crystal oscillators are added, the resultant combined frequency remains constant despite changes in the strength of the magnetic field within which the controlling transitions occur. At the same time, this system has the advantage of providing signals of large signal-to-noise ratio, particularly when optically pumped, to enable easier and better control of the oscillators. Optical pumping also enables the use of simple optical means for detecting said transitions.

The system described in said application tends to have a considerable duplication of the more expensive and/or more delicate parts. Thus, for example, two crystal oscillators are employed. In addition, in order to bring their frequencies up to the center frequencies of the transitions, the output of each of said oscillators is passed through a frequency synthesizer which consists essentially of a chain of multipliers and mixers. Thus, for example, where the vapor is sodium, it has been suggested in the above-mentioned application that each crystal oscillator have a frequency of approximately 1 megacycle and that it be multiplied by approximately 1800 times. Obviously, such synthesizers are expensive and tend to make the system complex and cumbersome. Various other duplications in expensive and/or cumbersome equipment are also required in the system described in said application.

An object of the present invention is the provision of an improved atomic frequency standard simultaneously utilizing both the above-mentioned kinds of transitions.

A feature of the present invention is the use of only a relatively stable single oscillator, such as a crystal oscillator, whose frequency is controlled by both kinds of transitions.

Other and further objects of the present invention will become apparent, and the foregoing will be better understood with reference to the following description of an embodiment thereof, reference being had to the drawings, in which.

To facilitate understanding of the present invention, there is next presented a brief discussion of the energy levels in the ground state of alkali metal vapors and variations of the center frequency of the frequency selective characteristics of transitions involving these levels with changes in the strength of the magnetic field in which these transitions occur. This discussion is principally directed to the energy levels and transitions of sodium 23, but its application to the other alkali metal vapors will be apparent.

Figure 1:
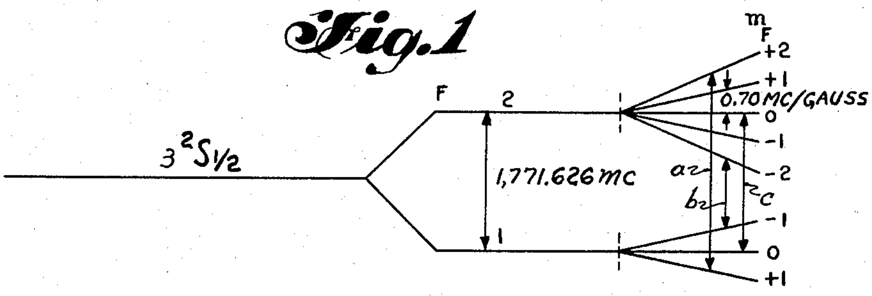
Fig. 1 is an energy level diagram of the ground state of sodium 23 showing the Zeeman splitting thereof.

Referring now to Fig. 1, which schematically indicates the ground energy levels of sodium 23, it will be seen that this energy level is split into two hyperfine levels $F=2$ and $F=1$, which are subject to Zeeman splitting into Zeeman sub-levels under the influence of a weak magnetic field. As shown in Fig. 1, the hyperfine level $F=2$ is split into five Zeeman sub-levels, while the hyperfine level $F=1$ is split into three Zeeman sub-levels. Transitions between the Zeeman sub-levels will be produced by proper excitation. Transitions between these sub-levels are governed by the selection rules for magnetic dipole radiation:

$$\Delta F=0, \pm 1 \Delta m_F=0, \pm 1$$

where $m_F$ is the magnetic quantum number used to distinguish said sub-levels. The particular transitions that are of principal interest here are those involving $\Delta F=1$ since the transitions $\Delta F=0$ correspond to relatively lower frequencies and thus are of lesser interest where high accuracy, such as for an atomic clock, is desired. More specifically, the transitions in alkali metal vapors of major interest for the embodiment of the present invention hereindescribed are the transitions $\Delta F=1 \Delta m_F=\pm 1$. In the case of sodium these transitions would be from $F=2 m_F=+2$ to $F=1 m_F=+1$; and $F=2 m_F=-2$ to $F=1 m_F=-1$. These two transitions are indicated by the letters *a* and *b*, respectively, in Fig. 1. The reason for selecting these transitions is that by utilizing optical pumping, for example by circularly polarized light, a greater signal-to-noise ratio is obtainable in detecting these transitions than, for example, would be obtained by detecting the $\Delta F=1 \Delta m_F=0$ transitions (for sodium 23, this is indicated by line C in Figs. 1 and 2), while at the same time by utilizing the techniques of the present invention, the sensitivity of these transitions to variations in the magnetic field strength is prevented from affecting the center frequency stability of the output of the system.

The effect of optically pumping an alkali metal vapor with right and left circularly polarized light is to raise the energy level of the atoms to an excited state from which they fall back to the ground state level producing a population increase principally in the largest absolute values of the magnetic momentum of the hyperfine energy levels. Thus, there would be an increase in the population pileup (Fig. 1) at $F=2m_F=+2$ and at $F=2m_F=-2$ in sodium 23. If the optical pumping is done with right circularly polarized light, then the pileup would tend to occur at one of the foregoing levels, for example, $m_F=+2$, and if the light is left circularly polarized, then the pileup would occur at the other of said levels $m_F=-2$. Unpolarized light which may be thought of as a random mixture of equal numbers of two kinds of photons, one left and one right circularly polarized, would produce pileups at both levels. In cesium the pileup would occur principally at $F=4m_F=+4$ and $F=4m_F=-4$. A similar pileup would occur for the other alkali metal vapors, it being a general observation that them ore hyperfine ground energy levels there are, the greater the tendency for the atoms in an excited state to distribute their enregy pileups over a greater number of said hyperfine levels. However, the largest pileup tends to be at the highest absolute values of the hyperfine ground energy level. When transitions are excited from these levels at which there is a population pileup, the resulting transitions produce a larger signal-to-noise ratio when detected.

Figure 2:
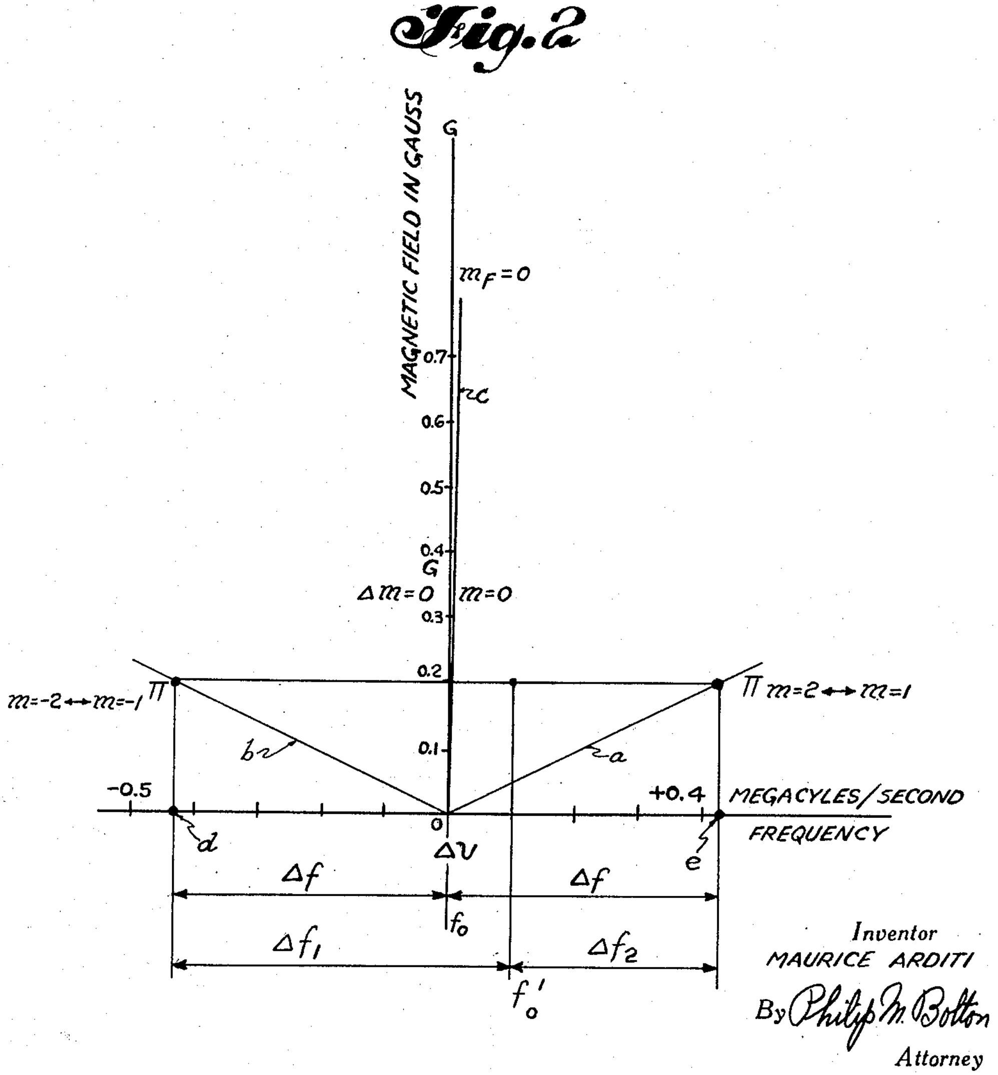
Fig. 2 is a diagram showing changes of frequency with changes of magnetic field strength for three microwave hyperfine ground energy level transitions in sodium 23.
Figure 3:
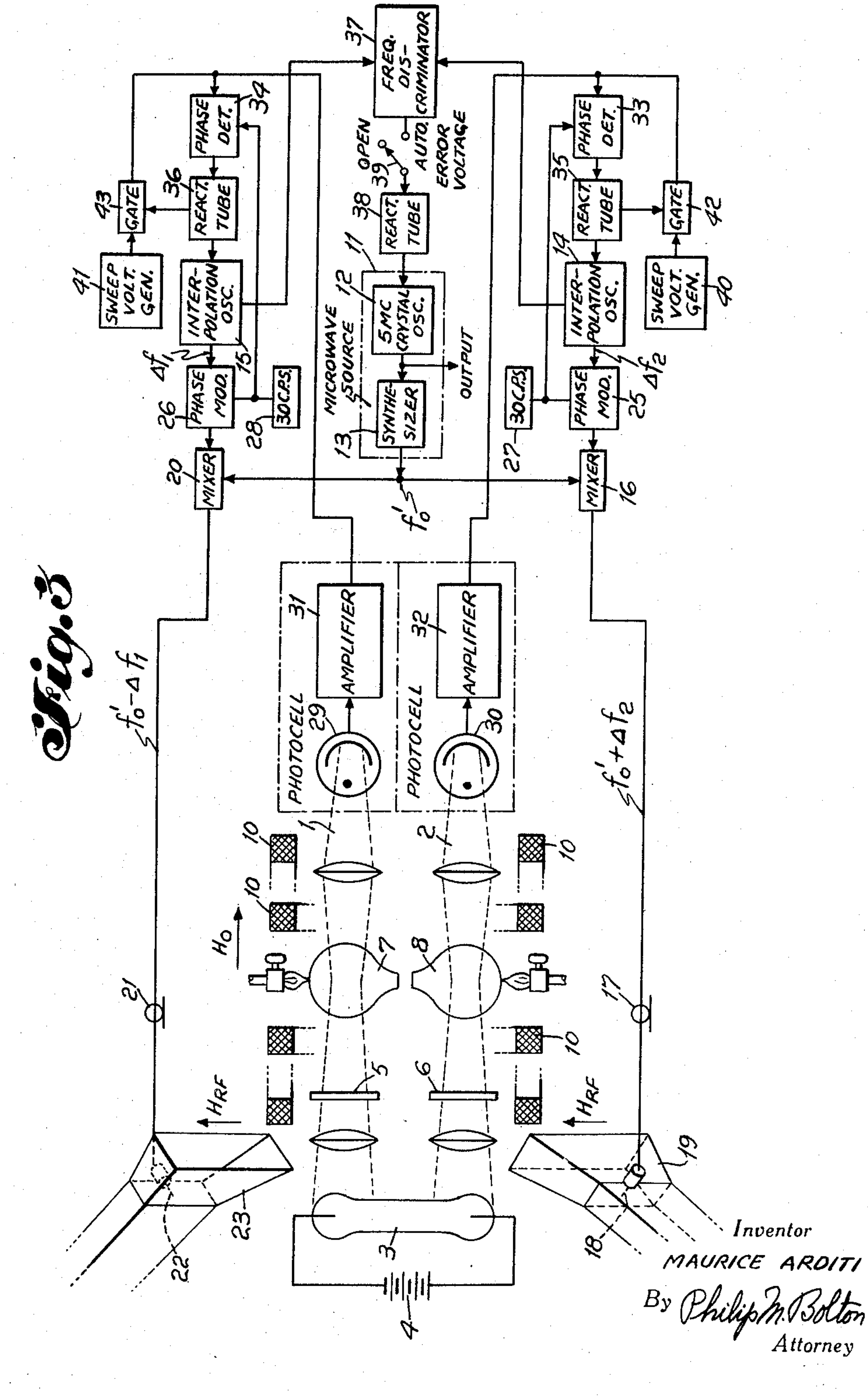
Fig. 3 is a schematic and block diagram of an atomic clock arrangement according to the present invention.

There is, however, a problem involved in the use of such transitions. This can be best seen by an examination of Fig. 2 which illustrates the effect of a change in the magnetic field upon the center frequency of the frequency selective characteristic of these transitions (in sodium 23). The transitions designated by the letters *a* and *b* of Fig. 1 are similarly designated in Fig. 2. The magnetic field strength is plotted along the ordinate, while frequency is plotted along the abscissa. The center frequency at a zero magnetic field for the $\Delta F=1\Delta m_F=1$ (sodium 23) hyperfine ground state transitions is approximately 1771.626+ megacycles per second; as the magnetic field increases, the center frequency of these transitions *a* and *b* vary as shown in opposite directions but symmetrically at the rate of 2.1 megacycles per gauss. It is because the center frequency of these transitions *a* and *b* shifts with the magnetic field that they have not been looked on favorably for purposes of atomic frequency standards. Instead, as described in the aforementioned application, it has been preferred to use the transition $\Delta F=1\Delta m_F=0$ (see C, Figs. 1 and 2). It will be seen that the center frequency of this transition is relatively insensitive to changes in the magnetic field strength. However, in detecting this transition, the signal-to-noise ratio obtained is relatively small as compared with the transitions *a* and *b* and therefore, in the present invention it is proposed to use the frequency-selective characteristics of the transitions *a* and *b*, or their counterparts in the other alkali metals, for example, for an atomic clock. One preferred embodiment of such a clock is illustrated in Fig. 3. However, before going into a discussion of Fig. 3, it may be well to point out at this time that Figs. 1 and 2 are not intended to be quantitatively exact and are used for illustrative purposes, these figures being intentionally exaggerated and distorted to make the present invention more easily understandable.

In the embodiment illustrated in Fig. 3, two gas cells are arranged in a substantially uniform static magnetic field, the two cells being optically pumped by right and left circularly polarized resonance light of the same alkali metal vapor as is contained in the cells. Transitions in each of these cells are produced by microwave energy directed therethrough whose R.F. field is at right angles to the static magnetic field and is likewise perpendicular to the direction of propagation of the light through said cells. In the illustrated embodiment, optical detection is used with a suitable automatic frequency control system to control the output frequency of a source of oscillations.

Referring now specifically to the embodiment illustrated in Fig. 3 two steady beams of circularly polarized resonant radiation 1 and 2 are obtained from a standard sodium lamp 3, preferably energized from a steady direct current energy source 4, whose light output is divided into two beams and directed through separate circular polarizers 5 and 6, with 5 producing right circularly polarized light and 6 producing left circularly polarized light so that beams 1 and 2 are of right and left circularly polarized light, respectively. By right circularly polarized light as used herein, the direction of polarization is the same as the direction of the magnetizing current producing the static magnetic field $H_0$ parallel to the direction of propagation of the light. Left circularly polarized light is opposite in direction to said magnetizing current. Beams 1 and 2 are directed respectively through gas cells 7 and 8, each containing vaporized sodium 23 and a buffer gas or gases, as will be more fully described hereinafter. The beams produce "optical pumping" in these cells.

Cells 7 and 8 may be prepared in the manner described in the copending application of M. Arditi-T. R. Carver, Serial No. 701,929, filed December 10, 1957, for "Frequency Selective Method and System" and may have a single buffer gas or a plurality of buffer gases therein as described in the copending application of M. Arditi, Serial No. 716,686, filed February 21, 1958, for "Gas Cell for Frequency Selective System" to provide pressure stabilization. The cells are, of course, heated as explained in the above-mentioned applications to a suitable temperature.

Means 9 are provided for establishing a static field $H_0$ permeating both gas cells 7 and 8 having at least a strong component parallel to the direction of propagation of the beams 1 and 2 into the gas cells 7 and 8. The means 9 for establishing a static magnetic field are preferably such as to provide as uniform a field as possible permeating both cells. It must be remembered that for the present purpose it is unnecessary that the magnetic field permeating both cells be constant, but merely that this magnetic field should be as nearly uniform as possible throughout the areas where the different transitions occur and in this specific example in cells 7 and 8. Various methods of achieving such uniformity may be employed. Obviously, one of the best techniques is to remove the cells from any magnetic field gradient or disturbances. For creating such a relatively weak magnetic field of relatively uniform characteristics, the means 9 may include two pairs at right angles of Helmholtz coils 10 surrounding said cells 7 and 8 and spaced apart a distance equal to their radiius and carrying the same current. To further increase uniformity, it may be found empirically that the use of shields may be desirable. Alternatively, or in addition to the Helmholtz coils, in order to correct field distortions it may be desirable to use suitably shaped permanent magnets for this purpose.

To excite transitions in gas cells 7 and 8, there is provided a relatively stable microwave frequency source 11 consisting of a crystal oscillator 12 and a frequency synthesizer 13, the synthesizer 13, in turn, consisting of a number of multipliers and mixers (not shown) to bring the frequency of the crystal oscillator 12 up to the desired level. In addition to the stable source 11, there is provided two interpolation oscillators 14 and 15. The output of interpolation oscillator 14 is added in a mixer 16 to that of the source 11 and is then applied via a coaxial line 17 to a probe 18 in a radiating horn 19 to illuminate and excite transitions in cell 7, the probe being so oriented that the R.F. magnetic field is perpendicular to the propagation of the light into cell 7 and is perpendicular also to the static magnetic field $H_0$. The output of interpolation oscillator 15 and source 11 are combined in mixer 20 so as to subtract the frequency of interpolation oscillator 15 from that of source 11, the resultant frequency then being fed via coaxial line 21 and radiated by a probe 22 in a horn 23 through cell 8 with the probe and horn being so oriented that the R.F. magnetic field is perpendicular to both the static magnetic field and the direction of light propagation through cell 8.

To lock the combined frequencies of the output of mixers 16 and 20 to the center frequency of the frequency characteristics of the ground transitions in cells 7 and 8 designated as $\Delta F=1\Delta m_F=+1$ and $\Delta F=1\Delta m_F=-1$, respectively, any suitable automatic frequency control means may be employed which varies the frequency of the interpolation oscillators 14 and 15, respectively. For this purpose, a small phase modulation is introduced in the output of oscillators 14 and 15 by means of phase modulators 25 and 26, respectively, which are driven by low frequency oscillators 27 and 28, respectively, which may have a frequency, for example, of 30 cycles per second. As this phase modulation occurs, there is a small change in the frequencies applied to the cells 7 and 8, varying the light outputs from each cell. This is detected by photocell detectors 29 and 30 each aligned with the direction of light passing into said cells from resonance lamp 3, these photocells, in turn, being connected via amplifiers 31 and 32, respectively, to phase detectors 33 and 34, respectively, wherein a comparison is made between the phase of the signal derived from each of said amplifiers 31 and 32 with the phase of the signal from sources 27 and 28, respectively, so that the outputs of phase detectors 33 and 34 give the derivative of the microwave resonance curve, or an S curve. The error voltages produced by detectors 33 and 34 are fed through reactance tubes 35 and 36, respectively, to control the frequency of interpolation oscillators 14 and 15 thereby locking said oscillators to the $\Delta m_F=\pm 1$ transitions for the corresponding value of the static magnetic field $H_0$.

To understand the operation of the system of Fig. 3 up to this point, let us turn to Fig. 2.

Assuming that initially the frequency of the source 11 is not at the center frequency $f_0$ (see Fig. 2) but that it is off center at a frequency $f_0'$ and assuming that the magnetic field is 0.2 gauss, the two transitions *a* and *b* will be at the frequencies indicated by points *d* and *e*. Interpolation oscillator 14 then will have a frequency $\Delta f_1$ so that the output of mixer 20, $f_0'-\Delta f_1$ equals the center frequency of the transition "*a*" in cell 7 with a magnetic field of 0.2 gauss. On the other hand, interpolation oscillator 14 will have a frequency $\Delta f_2$ in order that the output of mixer 16, $f_0'+\Delta f_2$, will equal the center frequency of transition *b* in cell 8 with a magnetic field of 0.2 gauss. In accordance with the present invention, in order to have an output from source 11 which is stable despite changes in the magnetic field, it is necessary that $f_0'$ should be at the center frequency ($f_0$) as shown in Fig. 1 and that $\Delta f_1=\Delta f_2$. Accordingly, the next step is to shift the frequency of the source 11 until $\Delta f_1$ is equal to $\Delta f_2$ or, stated another way, until the frequencies of interpolation oscillators 14 and 15 are equal. For this purpose, referring now back to Fig. 3, the frequencies of interpolation oscillators 14 and 15 are compared in the frequency discriminator 37 whose output controls a reactance tube 38 which, in turn, controls the frequency of the crystal oscillator 12, the error voltage from the frequency discriminator 37 being poled in the proper direction to move the frequency of oscillator 12 towards the center frequency position. To prevent too much back and forth movement and re-adjustments of the various oscillators and sources, a switch 39 between frequency discriminator 37 and reactance tube 38 is normally maintained open until the interpolation oscillators have reached a fixed frequency, the initial adjustment of source 11 being as close to the center frequency as feasible, and thereafter the switch 39 is closed to cause re-adjustments of the oscillator 12 and thereby of source 11 in accordance with the procedure hereinbefore outlined. The frequency discriminator 37 may be of any suitable type such as, for example, a pair of frequency counters each producing a D.C. voltage proportional to frequency, the D.C. voltages being compared or subtracted from each other to produce the control voltage.

At the time the apparatus is originally turned on, there is a probability that the frequencies used to excite the cells 7 and 8 deviate sufficiently from the center frequencies of the desired transitions so as to fail to excite transitions in said cells and thereby fail to provide detectable signals for use in the phase detectors 33 and 34. Accordingly, it is proposed to provide a means for sweeping the interpolation oscillators 14 and 15 over a range until the transitions are excited and the phase detectors 33 and 34 can operate to control and lock in the interpolation oscillators 14 and 15. For this purpose, sawtooth type sweep voltage generators 40 and 41 may be provided which provide sawtooth voltages via gates 42 and 43, respectively, to reactance tubes 35 and 36, these gates normally being open and adapted to be closed when a signal appears at the input of phase detectors 33 and 34, respectively. The gates, of course, may be in the form of A.C. operated relays with a sufficiently long delay time so as to eliminate excessive searching and chattering.

Some representative figures for one embodiment are as follows. The crystal oscillator 12 has a frequency of 5 megacycles, the synthesizer produces a multiplication thereof by approximately 360 times and the interpolation oscillators produce a frequency output of about 1 megacycle or under. Of course, the range of the interpolation oscillators will have to be made greater if the permitted variation in the magnetic field is allowed to increase above a minor fraction of a gauss.

While the system described herein in the specific example has been particularly directed to an arrangement using sodium as the alkali metal vapor, obviously the system also is applicable to similar arrangements utilizing the other alkali metal vapors. Similarly other variations pointed out in said copending application and applicable to the present invention may be employed. Also for any further details not fully described herein, reference is made to said above-mentioned application and the applications mentioned therein.

Accordingly, while I have described above the principles of my invention in connection with specific embodiments, it is to be understood that this description is made only by way of example and not as a limitation to the scope of my invention as set forth in the objects thereof and in the accompanying claims.

I claim:

1. An atomic frequency standard comprising a relatively stable source of radio frequency energy, a pair of interpolation oscillators, means for adding the frequency of one of said interpolation oscillators to that of said source to produce a sum frequency, means for subtracting the frequency of the other of said interpolation oscillators from that of said source to produce a difference frequency, a pair of cells of alkali metal vapor, means for establishing a substantially homogeneous static magnetic fields permeating both said cells, means for applying energy of said sum frequency to one of said cells to excite hyperfine ground energy level transitions of a first type therein, means for applying energy of said difference frequency to the other of said cells to excite microwave hyperfine ground energy level transitions of a second type therein, said static magnetic field having a substantial component at right angles to the applied microwave magnetic energy vector, the center frequency of the frequency characteristic of said types of transitions varying symmetrically and oppositely with changes in the strength of said component of said static magnetic field, means for detecting said transitions, automatic frequency control means coupled to the output of said detection means to vary the frequency of the interpolation oscillators to lock said sum frequency and said difference frequency to the center of the frequency selective characteristics of said first and said second types of transitions respectively, and means responsive to the difference in frequency between said two interpolation oscillators for adjusting the frequency of said stable oscillator until the frequencies of said two interpolation oscillators are equalized.

2. An atomic frequency standard comprising a relatively stable source of radio frequency energy, a pair of interpolation oscillators, means for adding the frequency of one of said interpolation oscillators to that of said source to produce a sum frequency, means for subtracting the frequency of the other of said interpolation oscillators from that of said source to produce a difference frequency, a pair of cells of alkali metal vapor, means for establishing a substantially homogeneous static magnetic field permeating both said cells, means for applying energy of said sum frequency and difference frequency to said separate ones of said cells to excite two types of hyperfine ground energy level transitions therein: $\Delta F=1\ m_F=+1$, and $\Delta F=1 \Delta m_F=-1$, respecspectively, where F designates a hyperfine ground energy level state of the alkali metal vapor and $m_F$ designates one of its Zeeman sub-levels, said static magnetic field having a substantial component at right angles to the applied microwave magnetic vector, means for detecting said transitions, automatic frequency control means coupled to the output of said detection means to vary the frequency of the interpolation oscillators to lock said sum frequency and said difference frequency to the center of the frequency selective characteristics of said first and said second types of transitions respectively, and means responsive to the difference in frequency between said two interpolation oscillators for adjusting the frequency of said stable oscillator until the frequencies of said two interpolation oscillators are equalized.

3. An atomic frequency sandard according to claim 2 further including means for exciting said cells to produce an increase of population at the largest absolute values of the magnetic momentum of the hyperfine energy levels in the ground state of the alkali metal vapor.

4. An atomic frequency standard according to claim 3 wherein said means for increasing the population includes means for optically pumping said cells with right and left circularly polarized light, respectively.

5. An atomic frequency standard according to claim 2 wherein said means for adding and said means for subtracting each consists of a mixer.

6. An atomic frequency standard according to claim 2 wherein said source of radio frequency energy comprises a crystal oscillator and a frequency synthesizer coupled to the output thereof.

7. An atomic frequency standard according to claim 2 further including means for directing right circularly polarized light through one cell and left circularly polarized light through the other cell.

8. An atomic frequency standard according to claim 7 wherein said detecting means comprises optical detection means positioned to receive the light directed through said cells.

References Cited in the file of this patent

UNITED STATES PATENTS

| | | |
|---|---|---|
| 2,560,365 | Norton | July 10, 1951 |
| 2,602,897 | Norton | July 8, 1952 |
| 2,669,659 | Norton | Feb. 16, 1954 |

OTHER REFERENCES

"Spin Resonance of Free Electrons Polarized by Exchange Collisions," by Dehmelt in Physical Review, vol. 109, No. 2, pages 381–385.